W. S. WARNOCK.
PLATE HOLDER.
APPLICATION FILED NOV. 4, 1904.

934,249.

Patented Sept. 14, 1909.
2 SHEETS—SHEET 2.

Witnesses:
O. J. Ostrander
Leon Stroh

Inventor:
Wallace S. Warnock
By G. L. Cragg
Atty.

UNITED STATES PATENT OFFICE.

WALLACE S. WARNOCK, OF CHICAGO, ILLINOIS.

PLATE-HOLDER.

934,249.    Specification of Letters Patent.    Patented Sept. 14, 1909.

Application filed November 4, 1904. Serial No. 231,362.

*To all whom it may concern:*

Be it known that I, WALLACE S. WARNOCK, citizen of the United States, residing at Chicago, in the county of Cook and State of Illinois, have invented a certain new and useful Improvement in Plate-Holders, of which the following is a full, clear, concise, and exact description, reference being had to the accompanying drawings, forming a part of this specification.

My invention relates to plate holders used by printers in holding electro-types, stereotypes, etc., and has several objects and features.

Hitherto it has been proposed to provide integrally formed foundation or bed blocks, of comparatively large size, containing grooves to receive the bases of register hooks. It has also been proposed to make these foundations of a number of smaller blocks, rectangular or square in contour, conforming in size to specially provided blocks that form component parts of registering devices including the movable hook elements. The solid foundations are made of cast iron, and, in order that they may not crack, the entire foundation is cast without hollow spaces underneath or above, the grooves for receiving the register hooks being machined in the casting block. The objection to providing blocks forming with register hooks the registering devices is on account of the expense of construction, the weight, danger of breakage, and the small range in which the register hooks may be adjusted without bodily changing their positions. I overcome both of these difficulties by forming the foundation or bed of a number of separable units engaging each other at their bottom portions, whereby they may be locked into a chase but separated from each other at their upper portions, whereby grooves are afforded in which the bases of the register hooks may be received as well as the screws or bolts that are provided to effect the adjustment of the register hooks. These individual blocks that together form the foundation spoken of are made hollow on their bottom sides, to lighten the weight of the form.

My invention also contemplates the provision of an improved register hook that is adaptable for use not only in connection with a foundation or bed as I prefer to construct the same, but also in connection with a foundation that is solid and which is grooved to receive the hooks and their screws.

In practicing my invention I preferably adapt the bases of the hooks for retention by both margins or walls of a receiving groove. In the preferred embodiment of my invention the hook base that surrounds the adjusting screw is partially surrounded by a stirrup of spring metal which is adapted, by virtue of its resiliency, to engage the opposite walls of the containing groove in the plate foundation. In the preferred embodiment of the invention the hook base that receives the screw is recessed, so that the ends of the spring member that are designed to engage the opposite walls of the containing groove in the plate foundation may be momentarily brought closer to each other, so that the hook base may be inserted into the said groove, whereafter the resiliency of the spring member will cause its ends to engage the said groove without, however, becoming disengaged from the hook base. The top margins of the grooves in the plate foundation or bed preferably slightly overhang, so that the bases of the register hooks will not only be retained by the opposite walls of the grooves in the plate foundation, but normally will be prevented from vertical displacement, it being necessary to collapse the spring member of the register hook in order to withdraw the base from the containing groove. In this way the register hook is properly engaged with both walls of the containing groove to prevent the register hook from binding, this result being preferably promoted by providing continuations of the spring member that extend longitudinally of the containing groove.

Another feature of my invention resides in providing a register hook that is adapted so to operate upon the plate whose position is to be adjusted, that the hook in coöperation with the anchorage or journal for the screw will pull the plate toward the said anchorage or journal. This is accomplished by causing the hook to face the anchorage bearing or point of purchase of the screw. A very useful advantage is obtained by this feature of my invention, in that, no hook actuating element need be provided on some of the hooks, employed for adjusting the position of the plate, on the outside of the plate, the adjusting means being preferably located beneath the upper surface of the plate foundation. In other words, the main screw head is covered by the plate after the parts are assembled. The screw may be provided with an additional head or formation beyond the position of the plate to be adjusted without losing the advantage of this feature of my invention, as the said head need not be provided with a coöperating anchorage for the screw where said head is located. The pulling register hooks are adjusted before the plate is put upon its foundation, whereupon the plate is inserted, the pulling hooks being upon two adjacent sides of the plate, whereafter the pushing hooks are brought into play to lock the plate. The screws of the pulling hooks may be provided with the outside supplemental heads above spoken of to get a very accurate adjustment of the plates after they have been engaged by the register hooks.

I will explain my invention more fully by reference to the accompanying drawings, showing the preferred embodiment thereof, in which—

Fig. 11 is a view on line 11—11 of Fig. 12. Fig. 18 shows an operating end of a pulling hook in position within containing grooves. Fig. 20 is a plan view of a modified construction of register hook wherein the hook element proper is rotatably mounted upon its base. Fig. 22 is a side elevation illustrating the construction of the base of a hook adapted for association with the member illustrated in Fig. 21. Fig. 23 is a view in perspective of the structure illustrated in Fig. 22.

Like parts are indicated by similar characters of reference throughout the different figures.

Figure 2:
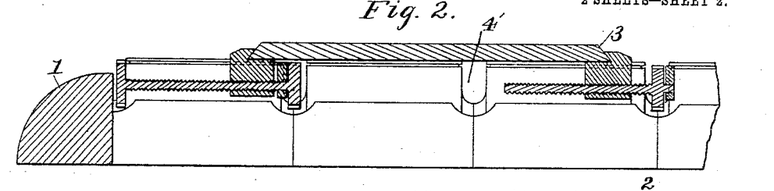
Fig. 2 is a sectional view of the structure as shown in Fig. 1.
Figures 3, 4, 5, 6, 7, 8, 9, 12, 13, 14, 21:
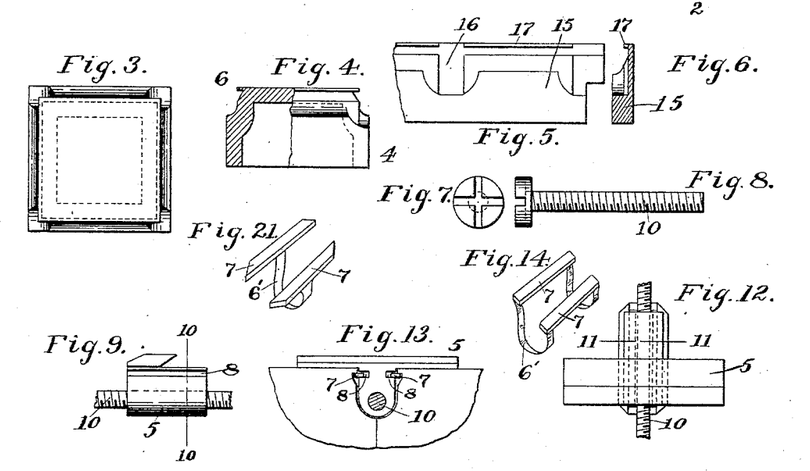
Fig. 3 is a plan view of one of the blocks composing the plate foundation.
Fig. 4 is a view in elevation, partially in section, of the block shown in Fig. 3.
Fig. 5 is an elevation, looking from the interior of the form, of a portion of one of the strips that constitutes a separable part of the plate foundation, whereby the size of the plate foundation may be made as small as practicable without depriving the register hooks of their proper coöperation with the plate foundation, for the purpose of holding the plate in position.
Fig. 6 is a sectional view of the structure as shown in Fig. 5.
Fig. 7 is an end view of the screw forming a part of a register hook.
Fig. 8 is a longitudinal view thereof.
Fig. 9 shows, in elevation, the portion of a register hook through which the adjusting screw passes.
Fig. 12 is a plan view of a complete register hook, excepting that the screw is broken.
Fig. 13 is an end elevation of the structure shown in Fig. 12.
Fig. 14 is a view of the spring member of the base of the register hook.
Fig. 21 is a view in perspective of another form of spring member for the register hook.
Figure 10:
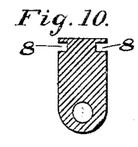
Fig. 10 is a view on line 10—10 of Fig. 9.
Figure 15:
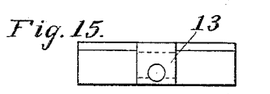
Fig. 15 is a detailed view of one of the plates of the register hook screws, in elevation.
Figure 16:
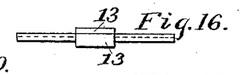
Fig. 16 is a plan view of the structure shown in Fig. 15.
Figure 17:
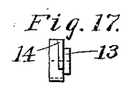
Fig. 17 is an end view of the structure shown in Figs. 15 and 16.
Figure 19:
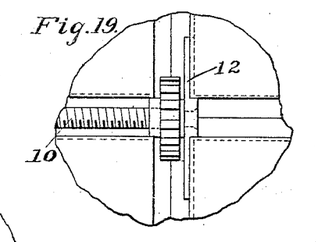
Fig. 19 is a plan view of the working end of a pushing hook in position within grooves.

A chase 1 has preferably disposed therein the square blocks 2 that are ruled with ordinate and coördinate lines to aid in the registry of the plate 3 that is disposed upon the foundation or bed comprising the blocks 2 that are clamped closely together in a manner well understood. The blocks 2 are preferably of the formation illustrated clearly in Figs. 2, 3 and 4, the said blocks at their lower portions having faces 4 that constitute meeting or clamping faces, whereby the said blocks may readily be assembled into a unitary foundation to support the said plate. The upper portions of the sides of the blocks are channeled or cut away, so that, when the blocks are assembled, there is provided, longitudinally of the plate foundation or bed and transversely of the plate foundation or bed, a series of grooves 4′ that are desirably shaped at their bottoms to receive and nicely fit the bottom surfaces of the bases of the hooks or jaws 5, the upper portions of the grooves in the plate foundation being margined by shoulders or lips 6, whereby the collapsible, separable, or spring member 6′ of the register hooks may be prevented from being withdrawn from the grooves until the longitudinal extensions 7 of the said spring members are moved toward each other by the hand or tweezers, it being these longitudinal extensions 7 that lie beneath the lips 6. The spring portion of the member 6′ is made of strip spring metal. The longitudinal portions 7 of the spring member 6′ are adapted not only to lie fully beneath the lips 6, but at the same time partially to lie within the grooves 8 provided in the bases of the register hooks, there being sufficient clearance, however, between the portions 7 and the bottoms of the grooves 8, so that the said portions 7 may be pressed farther into the grooves 8 by tweezers or the like, to enable the withdrawal of the register hooks from the engaging grooves in the plate foundation. The register hooks may readily be inserted within the grooves to contain the same, particularly where the structure shown in Figs. 21 and 23 is employed, by merely pressing the hook downwardly into position. The register hooks may thus readily be inserted in any portion of the plate foundation. The screws of the register hooks pass through plates 9 and thence into engagement with the bases of the register hooks where the said register hooks are pulling hooks, the said plates 9 acting as journals or anchorages. The screws or threaded shafts of the register hooks extend longitudinally of the grooves that contain the same. The plate 9 in each such case acts as a point of purchase for the screw, the said screw being substantially longitudinally immovable with respect to the said plate. Each screw 10 of each pulling hook desirably has two heads 11 upon its ends, though I do not wish to be limited to the number, location or character of the heads or other adjusting agencies that are provided for the screws.

Figure 1:
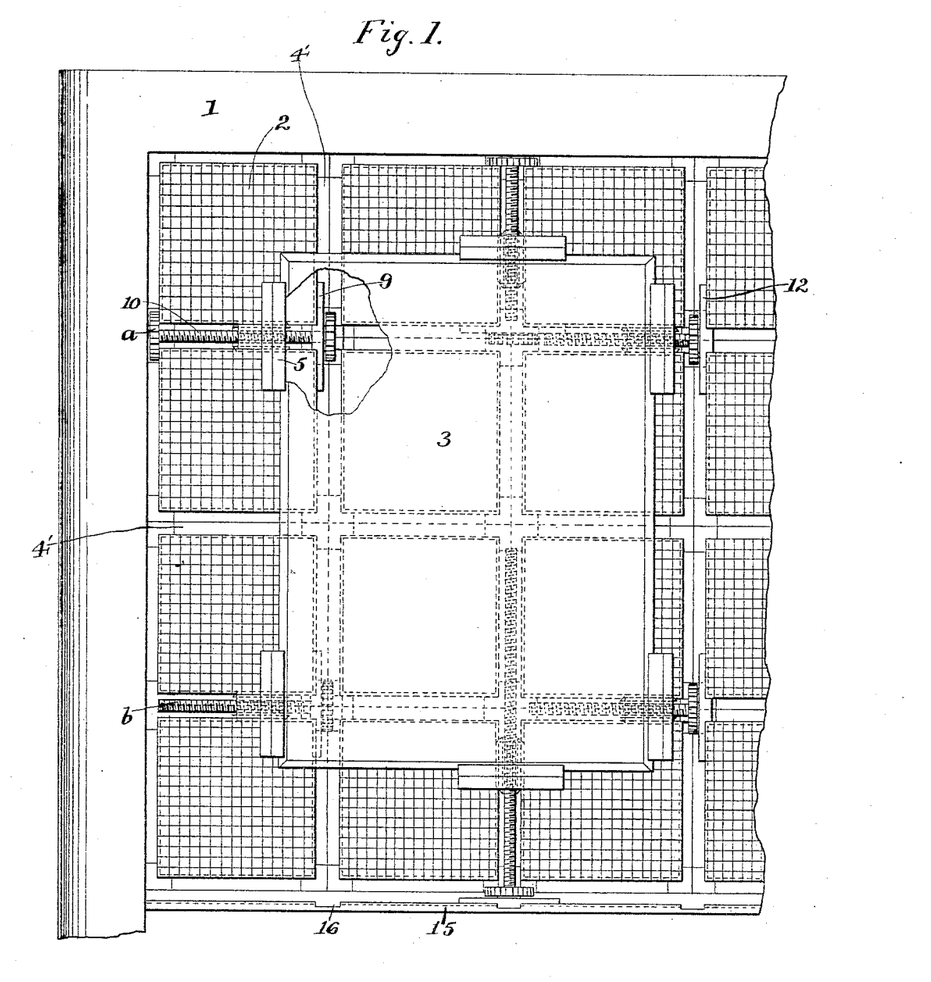
Figure 1 is a plan view of a form constructed and equipped in accordance with my invention.

In Fig. 1 the pulling hook *a* is provided with two heads, while the pulling hook *b* is provided with but one head. The pushing hooks are provided each with a single head, as indicated most clearly in Fig. 8. The heads of the screws are constructed to be adapted to the preferred adjusting tool. In the pulling hooks the hooks proper slope upwardly toward the point of anchorage or connection of the screws. In the pushing hooks the hooks proper slope upwardly away from the anchorage of the screws. In the pushing hook construction the plates 12 are at the very ends of the screws, the screws tending to separate the hooks and said plates 12 in clamping the stereotype or other printing plate in position contrary to the action upon the plates 9 in the pulling hooks. The plates 9 and 12 are provided with central projections 13 that are engaged between adjacent blocks in a manner to prevent the said plates from moving longitudinally of those grooves in which they lie lengthwise. The said plates are also provided with tongues 14 which extend toward the lips 6 and are engaged beneath the same to prevent the plates from being vertically displaced. The plates 9 and 12 and the bases of the register hooks define fixed axes of rotation for the screws of the register hooks, as the bases of the register hooks are also prevented from vertical displacement when the spring elements are in engagement with the lips 6. If it should be desired to adjust the plates 3 angularly, register hooks having pivoted jaws, as indicated in Fig. 20, may be employed.

Where it is desired to minimize the space occupied by the blocks 2, a strip 15 provided with recesses 16 for engaging the projection 13, to prevent longitudinal movement of the plates 12, may be employed, such plates being also provided with lips 17 that engage the projections 14, to prevent vertical displacement of the plates 12, whereby the axes of rotation of the screws of the register hooks may be properly maintained without the provision of additional blocks 2.

It will be seen that I have provided a printing plate holder including a plate-holding jaw adapted to rest above a grooved base or bed, automatic mechanism adapted to be passed down into a groove of the bed and operating upon being received by a groove to hold the jaw in relation to the bed, said jaw occupying a position transverse to the length of the groove, and mechanism for effecting the travel of the jaw parallel with the face of the bed and longitudinally of the groove engaging the holder toward and from the plate that is to be engaged by the jaw.

While I have shown a plate foundation formed of individually constructed blocks that are assembled to make said foundation, which blocks are grooved along their upper longitudinal edges to form grooves in the plate foundation, in which grooves the bases of register hooks are assembled, I do not wish to be limited to the exact location of said grooves in the said individually constructed blocks, as they may elsewhere be located.

I speak herein of effecting the travel of the jaw, meaning thereby that the jaw is moved in directions substantially parallel with the plate-supporting surface of the foundation.

It will be seen that I have provided a printing plate holder for a grooved foundation or bed comprising a body portion adapted to be passed down at any place into a groove, a transverse jaw coming above the foundation, and devices separate from and mounted upon said body portion at each side of the jaw and adapted to engage said groove to hold the printing plate holder to the bed and prevent accidental separation.

It is obvious that many changes may be made in the device of my invention herein illustrated without departing from the spirit of the invention, and I do not, therefore, wish to be limited to the precise construction shown, but

Having thus described my invention, I claim as new and desire to secure by Letters-Patent:—

1. A printer's registering device including a register hook provided with a base threaded for engagement with the screw of the registering device, and having provided longitudinally thereof grooves, a spring member provided with longitudinal continuations adapted for insertion within the said grooves, in combination with a grooved plate foundation provided with lips, beneath which the said extensions are adapted to be disposed, substantially as described.

2. The combination with a register hook, of an anchorage plate therefor, and a strip 15 having engagement with the anchorage plate to prevent longitudinal and vertical displacement thereof and acting as an abutment therefor, the anchorage plate being provided with a projection 14, while the strip 15 is provided with a corresponding lip or projection engaging the aforesaid projection to prevent vertical displacement of the anchorage plate, the said anchorage plate being provided with a projection, while the strip 15 is provided with a corresponding recess to engage said latter projection 13 to prevent longitudinal displacement of the anchorage plate, substantially as described.

3. The combination with a grooved plate foundation, of a register hook having its base in the groove of said foundation, said register hook including in its formation a spring member formed of strip spring metal adapted for engagement with both walls of the said groove, the said groove having overhanging lips for engaging the said spring member to prevent vertical displacement of the register hook, substantially as described.

4. The combination with a grooved plate foundation, of a register hook having its base in the groove of said foundation, said register hook including in its formation a spring member adapted for engagement with both walls of the said groove, the said groove having overhanging lips for engaging the said spring member to prevent vertical displacement of the register hook, the register hook base being grooved to receive therein the portions of the spring member that are also adapted to engage the overhanging lips, into which grooves the engaging portion of said spring member may further be depressed to permit the removal of the register hook, substantially as described.

5. The combination with a plate foundation formed of a plurality of individually constructed blocks channeled or cut away along their sides to afford grooves in the said plate foundation, and register hooks whose bases work within said grooves and have interlocking engagement therewith normally to prevent vertical displacement of the register hooks, contractible elements connected with said bases, whereby the removal of the register hooks may readily be effected, the said blocks being provided with overhanging lips 6 that engage with said contractible elements to provide the aforesaid interlocking engagement, the said interlocking engagement being had between the base of the register hook and both walls of the receiving groove, substantially as described.

6. The combination with a grooved plate foundation, of a register hook having its base in a groove of said foundation, said register hook including in its formation a spring member formed of strip spring metal adapted for engagement with said groove, the said groove having overhanging lips for engaging the said spring member to prevent vertical displacement of the register hook, substantially as described.

7. The combination with a grooved plate foundation, of a register hook having its base in a groove of said foundation, said register hook including in its formation a spring member formed of strip spring metal adapted for engagement with said groove, the said groove having an overhanging lip for engaging the said spring member to prevent vertical displacement of the register hook, substantially as described.

8. The combination with a grooved plate foundation, of a register hook having its base in a groove of said foundation, said register hook including in its formation a spring member formed of strip spring metal adapted for engagement with said groove, the plate-holding jaw being transverse to the length of the groove, there being means for securing the plate holder in various positions it may occupy along the groove, whereby the plate holder may be moved to different operative positions along the groove toward and from the plate to be held, substantially as described.

9. In combination with a supporting bed for printing plates having slots with under cut and shouldered sides and walls downwardly converging from the under cut portions, a clamp device for engaging and holding printing plates to said bed having a spring actuated engaging device composed of similar oppositely placed bent arms adapted to come in contact with the opposite converging walls of the slot and free bent ends adapted to come under the shouldered portions of the said slot.

10. In combination with a supporting bed for printing plates having slots with under cut and shouldered sides and walls downwardly extending from the under cut portions, a clamp device for engaging and holding printing plates to said bed having a spring actuated engaging device composed of similar oppositely placed bent arms adapted to come in contact with the opposite walls of the slot and free bent ends adapted to come under the shouldered portions of the said slot.

11. The combination with a plate foundation having grooves therein provided with an undercut shouldered side wall, of a register hook having its base in one of said grooves, said register hook being provided with means for longitudinal adjustment and spring actuated means for engaging under the shoulder of said side wall for retaining the hook within the groove.

12. A printing plate holder including a base adapted to be passed down into a grooved foundation or bed, a plate holding jaw coming above the foundation, and spring mechanism for holding the jaw in relation to the bed, the plate-holding jaw being transverse to the length of the groove, there being means for securing the plate holder in various positions it may occupy along the groove, whereby the plate holder may be moved to different operative positions along the groove toward and from the plate to be held.

13. A printing plate holder including a base adapted to be passed down into a grooved foundation or bed, a traveling plate holding jaw coming above the foundation, spring mechanism for holding the jaw in relation to the bed, and mechanism for effecting the travel of the jaw in directions substantially parallel with the plate-supporting surface of the foundation.

14. A printing plate holder including a base adapted to be passed down into a grooved foundation or bed, a traveling plate holding jaw coming above the foundation, mechanism for holding the jaw in relation to the bed, and mechanism for effecting the travel of the jaw together with the base of the jaw in directions substantially parallel with the plate-supporting surface of the foundation.

15. A printing plate holder including a base adapted to be passed down into a grooved foundation or bed, a traveling plate-holding jaw coming above the foundation, automatically operated mechanism for holding the jaw in relation to the bed, and mechanism for effecting the travel of the jaw together with the base of the jaw in directions substantially parallel with the plate-supporting surface of the foundation, the mechanism for holding the jaw in relation to the bed acting automatically independently of the mechanism that serves to effect the travel of the jaw.

16. A printing plate holder including a base adapted to be passed down into a grooved foundation or bed, a traveling plate holding jaw coming above the foundation, spring mechanism for holding the jaw in relation to the bed, and mechanism for effecting the travel of the jaw together with the base of the jaw in directions substantially parallel with the plate-supporting surface of the foundation.

17. A printing plate holder including a base adapted to be passed down into a grooved foundation or bed, a plate holding jaw coming above the foundation, and a spring device provided upon each side of the base of the jaw and engaging the sides of the groove into which the base of the jaw is inserted for holding the jaw in relation to the bed.

18. A printing plate holder including a base adapted to be passed down into a grooved foundation or bed, a traveling plate holding jaw coming above the foundation, a spring device provided upon each side of the base of the jaw and engaging the sides of the groove into which the base of the jaw in directions substantially parallel with the plate-supporting surface of the foundation is inserted for holding the jaw in relation to the bed, and mechanism for effecting the travel of the jaw.

19. A printing plate holder including a base adapted to be passed down into a grooved foundation or bed, a traveling plate holding jaw coming above the foundation, a spring device provided upon each side of the base of the jaw and engaging the sides of the groove into which the base of the jaw is inserted for holding the jaw in relation to the bed, and mechanism for effecting the travel of the jaw in directions substantially parallel with the plate-supporting surface of the foundation together with the base of the jaw.

20. A printing plate holder including a base adapted to be passed down into a grooved foundation or bed, a traveling plate holding jaw coming above the foundation, mechanism for holding the jaw in relation to the bed, and mechanism for effecting the travel of the jaw in directions substantially parallel with the plate-supporting surface of the foundation, the mechanism that effects the travel of the jaw being adapted to engage the plate foundation, thereby to secure purchase upon the plate foundation to effect the travel of the jaw.

21. A printing plate holder including a base adapted to be passed down into a grooved foundation or bed, a traveling plate holding jaw coming above the foundation, automatically operated mechanism for holding the jaw in relation to the bed, and mechanism for effecting the travel of the jaw in directions substantially parallel with the plate-supporting surface of the foundation, the mechanism that effects the travel of the jaw being adapted to engage the plate foundation, thereby to secure purchase upon the plate foundation to effect the travel of the jaw, the mechanism for holding the jaw in relation to the bed acting automatically independently of the mechanism that serves to effect the travel of the jaw.

22. A printing plate holder including a base adapted to be passed down into a grooved foundation or bed, a traveling plate holding jaw coming above the foundation, spring mechanism for holding the jaw in relation to the bed, and mechanism for effecting the travel of the jaw in directions substantially parallel with the plate-supporting surface of the foundation, the mechanism that effects the travel of the jaw being adapted to engage the plate foundation, thereby to secure purchase upon the plate foundation to effect the travel of the jaw.

23. A printing plate holder including a base adapted to be passed down into a grooved foundation or bed, a traveling plate holding jaw coming above the foundation, a spring device provided upon each side of the base of the jaw and engaging the sides of the groove into which the base of the jaw is inserted for holding the jaw in relation to the bed, and mechanism for effecting the travel of the jaw in directions substantially parallel with the plate-supporting surface of the foundation, the mechanism that effects the travel of the jaw being adapted to engage the plate foundation, thereby to secure purchase upon the plate foundation to effect the travel of the jaw.

24. A printing plate holder including a base adapted to be passed down into a grooved foundation or bed, a traveling plate holding jaw coming above the foundation, mechanism for holding the jaw in relation to the bed, and mechanism for effecting the travel of the jaw together with the base of the jaw in directions substantially parallel with the plate-supporting surface of the foundation, the mechanism that is provided for effecting the travel of the jaw together with its base being adapted to engage the foundation, thereby to secure purchase to effect the travel of the jaw and base thereof along the grooves.

25. A printing plate holder including a base adapted to be passed down into a grooved foundation or bed, a traveling plate holding jaw coming above the foundation, automatically operated mechanism for holding the jaw in relation to the bed, and mechanism for effecting the travel of the jaw together with the base of the jaw in directions substantially parallel with the plate-supporting surface of the foundation, the mechanism that is provided for effecting the travel of the jaw together with its base being adapted to engage the foundation, thereby to secure purchase to effect the travel of the jaw and base thereof along the grooves, the mechanism for holding the jaw in relation to the bed acting automatically independently of the mechanism that serves to effect travel of the jaw.

26. A printing plate holder including a base adapted to be passed down into a grooved foundation or bed, a traveling plate holding jaw coming above the foundation, spring mechanism for holding the jaw in relation to the bed, and mechanism for effecting the travel of the jaw together with the base of the jaw in directions substantially parallel with the plate-supporting surface of the foundation, the mechanism that is provided for effecting the travel of the jaw together with its base being adapted to engage the foundation, thereby to secure purchase to effect the travel of the jaw and base thereof along the grooves.

27. A printing plate holder including a base adapted to be passed down into a grooved foundation or bed, a traveling plate holding jaw coming above the foundation, a spring device provided upon each side of the base of the jaw and engaging the sides of the groove into which the base of the jaw is inserted for holding the jaw in relation to the bed, and mechanism for effecting the travel of the jaw together with the base of the jaw in directions substantially parallel with the plate-supporting surface of the foundation, the mechanism that is provided for effecting the travel of the jaw together with its base being adapted to engage the foundation, thereby to secure purchase to effect the travel of the jaw and base thereof along the grooves.

28. A printing plate holder including a base adapted to be passed down into a grooved foundation or bed, plate-clamping mechanism including a plate-holding jaw coming above the foundation, and an automatically operating device provided in connection with the plate holder adapted to engage a groove and thereby secure the holder from separation from the foundation, the automatically operating mechanism acting independently of the clamping mechanism.

29. A printing plate holder including a base adapted to be passed down into a grooved foundation or bed, a traveling plate holding jaw coming above the foundation, a device provided in connection with the plate holder adapted to engage a groove and thereby secure the holder from separation from the foundation, and mechanism for effecting the travel of the jaw in directions substantially parallel with the plate - supporting surface of the foundation, said mechanism being adapted to engage the foundation, thereby to secure purchase and effect travel of the jaw and the base thereof along the grooves.

30. The combination with a plate foundation provided with two sets of parallel grooves, one set of parallel grooves being transversely disposed with respect to the other set of parallel grooves, plate holding jaws provided with bases adapted to be passed down into said grooves, and mechanism for effecting the travel of the plate holding jaws in directions substantially parallel with the plate-supporting surface of the foundation.

31. The combination with a plate foundation provided with two sets of parallel grooves, one set of parallel grooves being transversely disposed with respect to the other set of parallel grooves, plate holding jaws provided with bases adapted to be passed down into said grooves, mechanism for effecting the travel of the plate holding jaws in directions substantially parallel with the plate-supporting surface of the foundation, and mechanism for holding the bases within the grooves.

32. The combination with a plate foundation provided with two sets of parallel grooves, one set of parallel grooves being transversely disposed with respect to the other set of parallel grooves, clamping devices including plate-holding jaws provided with bases adapted to be passed down into said grooves, and automatically operated mechanism for holding the bases within the grooves and operating independently of the clamping devices.

33. The combination with a plate foundation provided with two sets of parallel grooves, one set of parallel grooves being transversely disposed with respect to the other set of parallel grooves, plate holding jaws provided with bases adapted to be passed down into said grooves, mechanism for effecting the travel of the plate holding jaws in directions substantially parallel with the plate-supporting surface of the foundation, and automatically operated mechanism for holding the bases within the grooves and operating independently of the mechanism that effects the travel of the jaws.

34. The combination with a plate foundation provided with two sets of parallel grooves, one set of parallel grooves being transversely disposed with respect to the other set of parallel grooves, plate holding jaws provided with bases adapted to be passed down into said grooves, and spring mechanism for holding the bases within the grooves.

35. The combination with a plate foundation provided with two sets of parallel grooves, one set of parallel grooves being transversely disposed with respect to the other set of parallel grooves, plate holding jaws provided with bases adapted to be passed down into said grooves, mechanism for effecting the travel of the plate holding jaws in directions substantially parallel with the plate-supporting surface of the foundation, and mechanism for holding the bases within the grooves.

36. A printing plate supporting bed or foundation having grooves provided with shouldered sides, in combination with a printing plate holder including a base adapted to be passed down into the grooves of the foundation, a plate-holding jaw coming above the foundation, mechanism for effecting the travel of the jaw, and automatically operated mechanism coöperating with the shouldered portion of a groove for holding the jaw in relation to the foundation and operating independently of the mechanism that effects the travel of the jaw.

37. A printing plate supporting bed or foundation having grooves provided with shouldered sides, in combination with a printing plate holder including a base adapted to be passed down into the grooves of the foundation, a plate-holding jaw coming above the foundation, mechanism coöperating with the shouldered portion of a groove for holding the jaw in relation to the foundation, and mechanism for effecting the travel of the jaw over the surface of the foundation.

38. A printing plate supporting bed or foundation having grooves provided with shouldered sides, in combination with a printing plate holder including a base adapted to be passed down into the grooves of the foundation, a plate-holding jaw coming above the foundation, automatically operated mechanism coöperating with the shouldered portion of a groove for holding the jaw in relation to the foundation, and mechanism for effecting the travel of the jaw over the surface of the foundation, said automatically operating mechanism acting independently of the mechanism employed to effect the travel of the jaw.

39. A printing plate holder including a base adapted to be passed down into a grooved foundation or bed, a traveling plate-holding jaw coming above the foundation, mechanism for holding the jaw in relation to the bed, and mechanism for effecting the travel of the jaw in directions substantially parallel with the plate-supporting surface of the foundation.

40. A printing plate holder including a base adapted to be passed down into a grooved foundation or bed, a traveling plate-holding jaw coming above the foundation, automatically operated mechanism for holding the jaw in relation to the bed, and mechanism for effecting the travel of the jaw in directions substantially parallel with the plate-supporting surface of the foundation, said automatically operating mechanism acting independently of the mechanism employed to effect the travel of the jaw.

41. A printing plate supporting bed or foundation having grooves provided with shouldered sides, in combination with a printing plate holder including a base adapted to be passed down into the grooves of the foundation, a plate-holding jaw coming above the foundation, mechanism coöperating with the shouldered portion of a groove for holding the jaw in relation to the foundation, and mechanism for effecting the travel of the jaw together with its base in directions substantially parallel with the plate-supporting surface of the foundation.

42. A printing plate supporting bed or foundation having grooves provided with shouldered sides, in combination with a printing plate holder including a base adapted to be passed down into the grooves of the foundation, a plate-holding jaw coming above the foundation, automatically operated mechanism coöperating with the shouldered portion of the groove for holding the jaw in relation to the foundation, and mechanism for effecting the travel of the jaw together with its base in directions substan- tially parallel with the plate-supporting surface of the foundation, said automatically operating mechanism acting independently of the mechanism employed to effect the travel of the jaw.

43. A printing plate holder for a grooved foundation or bed comprising a body portion adapted to be passed down at any place into a groove, a transverse jaw coming above the foundation and adapted to come between the printing plates and to engage an edge thereof, and a spring actuated device mounted upon said body portion and adapted to automatically engage said groove and hold the printing plate holder to the bed and prevent accidental separation.

44. A printing plate holder for a grooved foundation or bed comprising a body portion adapted to be passed down at any place into a groove, a transverse jaw coming above the foundation and adapted to come between the printing plates, and a spring actuated device mounted upon said body portion and adapted to automatically engage said groove and hold the printing plate holder to the bed and prevent accidental separation.

45. A printing plate holder for a grooved foundation or bed comprising a body portion adapted to be passed down at any place into a groove, a transverse jaw coming above the foundation and adapted to come between the printing plates and to engage an edge thereof, and a spring actuated device mounted upon said body portion and coming directly beneath the printing plate engaged and adapted to automatically engage said groove and hold the printing plate holder to the bed and prevent accidental separation.

46. A printing plate holder including a plate-holding jaw adapted to rest above a grooved base, and spring mechanism for holding the plate holding jaw in relation to the bed and adapted to be passed downward into a groove of the bed, the plate-holding jaw being transverse to the length of the groove, there being means for securing the plate holder in various positions it may occupy along the groove, whereby the plate holder may be moved to different operative positions along the groove toward and from the plate to be held.

47. A printing plate holder including a traveling plate-holding jaw adapted to overlie a grooved foundation or bed, spring means for holding it in engagement with the groove into which the spring means is adapted to be passed down, and mechanism for effecting the travel of the jaw in directions substantially parallel with the plate-supporting surface of the foundation.

48. A printing plate holder including a traveling plate-holding jaw adapted to overlie a grooved foundation or bed, the base of the jaw being adapted to be passed down into a groove of the foundation or bed and provided with spring means for holding it in engagement with the groove into which it is passed down, and mechanism for effecting the travel of the jaw together with the base thereof in directions substantially parallel with the plate-supporting surface of the foundation.

49. A printing plate holder having clampism and serving to hold the plate holding jaw adapted to rest above a grooved base, and automatically operated mechanism acting independently of the clamping mechanism and serving to hold the plate-holding jaw in relation to the bed and adapted to be passed downward into a groove of the bed.

50. A printing plate holder including a traveling plate-holding jaw adapted to overlie a grooved foundation or bed, the base of the jaw being adapted to be passed down into a groove of the foundation or bed and provided with means for holding it in engagement with the groove into which it is passed down, and mechanism for effecting the travel of the jaw in directions substantially parallel with the plate-supporting surface of the foundation.

51. A printing plate holder including a traveling plate-holding jaw adapted to overlie a grooved foundation or bed, the base of the jaw being adapted to be passed down into a groove of the foundation or bed and provided with means for holding it in engagement with the groove into which it is passed down, and mechanism for effecting the travel of the jaw together with the base thereof in directions substantially parallel with the plate-supporting surface of the foundation.

52. A printing plate holder including a plate-holding jaw adapted to rest above a grooved base or bed, automatic mechanism adapted to be passed down into a groove of the bed and operating upon being received by a groove to hold the jaw in relation to the bed, said jaw occupying a position transverse to the length of the groove, and mechanism for effecting the travel of the jaw parallel with the face of the bed and longitudinally of the groove engaging the holder toward and from the plate that is to be engaged by the jaw.

53. A printing plate holder including a plate-holding jaw adapted to rest above a grooved base or bed, automatic mechanism adapted to be passed down into a groove of the bed and operating upon being received by a groove to hold the jaw in relation to the bed, said jaw occupying a position transverse to the length of the groove, the plate holder being bodily movable lengthwise of the groove to permit the jaw to be moved toward and from the plate that is to be engaged by the jaw, there being means for securing the plate holder in various positions it may occupy along the groove.

54. A printing plate holder including a plate-holding jaw adapted to rest above a grooved base or bed, automatic mechanism adapted to be passed down into a groove of the bed and operating upon being received by a groove to hold the jaw in relation to the bed, said jaw occupying a position transverse to the length of the groove, the plate holder being bodily movable lengthwise of the groove to permit the jaw to be moved toward and from the plate that is to be engaged by the jaw, there being means for securing the plate holder in various positions it may occupy along the groove, and mechanism for effecting the travel of the jaw parallel with the face of the bed and longitudinally of the groove engaging the holder.

In witness whereof, I hereunto subscribe my name this first day of November A. D., 1904.

WALLACE S. WARNOCK.

Witnesses:
G. L. CRAGG,
LEON STROH.